(No Model.)
W. EAVES.
TUBE FOR TUBULAR BOILERS.
No. 493,376. Patented Mar. 14, 1893.
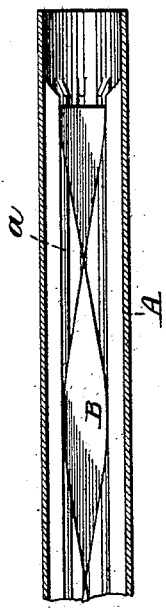
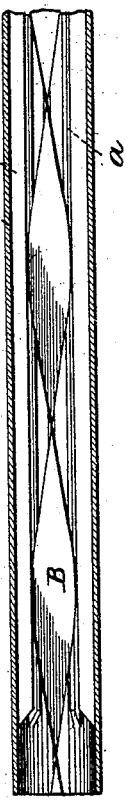
Fig. 1.  Fig. 2.  Fig. 3.
Attest:
Geo. T. Smallwood
[signature]
Inventor:
William Eaves
by [signature]
his attorneys
THE NORRIS PETERS CO., PHOTO-LITHO., WASHINGTON, D. C.

United States Patent Office.

WILLIAM EAVES, OF SHEFFIELD, ENGLAND.

TUBE FOR TUBULAR BOILERS.

SPECIFICATION forming part of Letters Patent No. 493,376, dated March 14, 1893.

Application filed October 11, 1892. Serial No. 448,493. (No model.)

*To all whom it may concern:*

Be it known that I, WILLIAM EAVES, engineer, a subject of the Queen of Great Britain and Ireland, residing at the Atlas Steel and Iron Works, Sheffield, in the county of York, England, have invented certain Improvements in or Connected with Tubes for Tubular Boilers, of which the following is a specification.

The object of my invention is to provide tubes, for tubular boilers, which are more efficient than are tubes with internal ribs, or with retarders as hitherto constructed, or arranged.

According to my invention I apply to tubes having internal ribs, corrugations or projections, (preferably longitudinal internal ribs such as are used in what are known as "Serve tubes") a retarder, or strip, of spiral, or other convenient shape placed in the center of the tube between the edges of the ribs, corrugations, or projections and with a diameter equal, or approximately equal, to the space between the longitudinal edges of such ribs, corrugations, or projections, and by this combination I obtain a very efficient breaking up of the column of hot gases passing through the tubes and efficient contact of the said gases with the heat absorbing surfaces and consequently a greater evaporative effect than hitherto, while there is also absence, or diminution of accumulation of soot, ashes, coal or the like, which occurs in tubes provided with retarders as hitherto.

The accompanying drawings illustrate an arrangement according to my invention.

Figure 1 is a longitudinal section and Fig. 2 a cross section of a tube provided with an arrangement according to my invention. Fig. 3 is a separate view of the retarder.

A is a Serve tube with internal ribs *a*.

B is a spiral strip which is inserted in the said tube the width or diameter of the said strip being equal to the central space in the tube between the edges of the ribs.

Although I have shown a retarder of spiral form yet I do not limit myself to that particular form nor do I limit myself to the form of ribs shown in the tube as the retarder may be of any shape which will act as described to break up, or deflect, the column of gases passing through the tube and cause efficient contact of the said gases with the heat absorbing surfaces presented by the tube and its ribs corrugations or projections.

Having now particularly described and ascertained the nature of the said invention and in what manner the same is to be performed, I declare that what I claim is—

A boiler tube having in its interior ribs corrugations or projections in combination with a retarder situated in the space between the ribs corrugations or projections of the tube substantially as, and for the purposes, hereinbefore described.

In testimony whereof I have signed my name to this specification in the presence of two subscribing witnesses.

WILLIAM EAVES.

Witnesses:
C. B. HOBBIS,
HENRY T. H. MARSDEN,
*Both of 41 Norfolk Street, Sheffield, Solicitor's Clerks.*